United States Patent
Calandra

(10) Patent No.: US 6,276,698 B1
(45) Date of Patent: Aug. 21, 2001

(54) COLLAPSIBLE GAME TOTE

(76) Inventor: Anthony L. Calandra, 3 Meriwether Dr., Savannah, GA (US) 31406

( * ) Notice: Subject to any disclaimer, the term of this patent is extended or adjusted under 35 U.S.C. 154(b) by 0 days.

(21) Appl. No.: 09/498,474

(22) Filed: Feb. 4, 2000

(51) Int. Cl.$^7$ .................................................. B62B 15/00
(52) U.S. Cl. .................................... 280/19; 280/18
(58) Field of Search .................. 280/18, 19, 20, 280/28.13, 28.17, 63, 47.24, 47.26, 493, 494, 495, 400, 467, 498, 414.1, 202, 204, 659, 656, 652, 405.1, 406.1, 416; 138/106, 172, 178; 248/49

(56) References Cited

U.S. PATENT DOCUMENTS

| | | |
|---|---|---|
| D. 417,172 | 11/1999 | Smith et al. . |
| 1,364,383 * | 1/1921 | King ........................ 280/19 |
| 1,487,941 * | 3/1924 | Hammett .................. 119/754 |
| 1,760,130 * | 5/1930 | Forrest .................... 280/495 |
| 2,104,734 * | 1/1938 | Carpenter ................ 280/495 |
| 2,308,699 * | 1/1943 | Longenecker ............ 280/19 |
| 2,778,552 * | 1/1957 | Thompson ................. 224/1 |
| 2,974,971 * | 3/1961 | Buck ......................... 280/19 |
| 2,981,548 * | 4/1961 | Taylor ...................... 280/29 |
| 3,336,060 * | 8/1967 | Bradford ................... 287/54 |
| 3,355,187 * | 11/1967 | Brindle ...................... 280/19 |
| 3,912,290 | 10/1975 | Rich . |
| 4,045,040 * | 8/1977 | Fails ......................... 280/1.5 |
| 4,283,068 | 8/1981 | Keyser . |
| 4,335,891 | 6/1982 | Alley . |
| 4,405,673 | 9/1983 | Fridley et al. . |
| 4,548,372 * | 10/1985 | Lutzker ..................... 249/99 |
| 4,718,684 * | 1/1988 | Rabatic ..................... 280/20 |
| 4,886,294 * | 12/1989 | Nahachewski ............ 280/755 |
| 4,887,823 | 12/1989 | Hallett et al. . |
| 5,090,714 * | 2/1992 | Seekins et al. ........... 280/24 |
| 5,529,321 | 6/1996 | Thompson . |
| 5,645,292 | 7/1997 | Mc Williams et al. . |
| 5,660,402 * | 8/1997 | Jones et al. .............. 280/19 |
| 5,836,812 * | 11/1998 | Brackett .................. 452/187 |
| 5,911,556 | 6/1999 | Caldwell . |

FOREIGN PATENT DOCUMENTS 807497   6/1951  (DE) .

* cited by examiner

Primary Examiner—Brian L. Johnson
Assistant Examiner—Bridget Avery
(74) Attorney, Agent, or Firm—Richard C. Litman

(57) ABSTRACT

A collapsible game tote includes a disassembleable rigid peripheral frame with a flexible sheet removably secured thereover for the support and carriage of killed large game or other articles thereon. The longitudinal members of the frame may be formed of sections of EMT material, or may alternatively be formed of poles cut in the field, if so desired. The assembly may be compactly folded for carriage upon an all terrain vehicle, and may be quickly and easily assembled in the field for the transport of a large game animal or other heavy or bulky load from the field to a road, campsite, or other location as desired. The front crossmember is equipped with a removably installable hitch for connecting the present tote to a conventional trailer hitch ball. The hitch has a generally circular loop having an inside diameter for passing over the hitch ball of the towing vehicle, and a narrower elongate forward extension. When the circular loop of the hitch is dropped over the hitch ball of the towing vehicle, the towing vehicle is pulled forward to draw the elongate extension around the narrower neck of the ball, where the extension is captured by the larger diameter of the ball and cannot release except by drawing the tote forward relative to the towing vehicle. The rear end of the tote is equipped with a skid extending from the rearward end of each of the longitudinal members, for precluding ground contact and abrasion of the remainder of the structure.

9 Claims, 4 Drawing Sheets

COLLAPSIBLE GAME TOTE

BACKGROUND OF THE INVENTION

1. Field of the Invention

The present invention relates generally to the hunting of large game, such as deer and comparably sized animals, and more specifically to a collapsible game tote adapted for the removal of game from the field. The present game tote has a rigid frame with a pliable tarp or sheet extending thereacross, with the sheet being removable and the frame collapsible for compact storage. A hitch is also provided for towing the game tote behind an all terrain vehicle, snowmobile, or other small off road vehicle.

2. Description of the Related Art

While hunting is no longer a way of life for most people, the sport remains popular as a recreational activity for many persons. In fact, some statistics indicate that hunting is gaining in popularity, with various aspects of the sport (enjoying the outdoors, bringing home food for the household, etc.) being enjoyed by many hunters. However, at the same time that more and more hunters are seeking areas in which to hunt, increasing population has taken more and more land which was previously available for such activities. Accordingly, many hunters are having to range farther and farther from easily accessible hunting grounds, and are forced to hunt in ever more rugged and remote areas.

As a result, more and more hunters are using ATVs (all terrain vehicles), small, nimble one or two seat wheeled vehicles having high ground clearance and large suspension travel for traveling to such remote hunting areas. While the use of an ATV provides ease of access for the hunter, the problem remains of removing a killed animal from the remote site and back to the hunter's road vehicle, camp site, or other area. Most such ATVs have accessory racks mounted to the back end, but these accessory racks are two or more feet above the ground. As a result, the hunter must lift the dead animal and place it upon the rack. This is not an easily accomplished task in many cases, depending upon the size, physical strength, and physical condition of the hunter, as well as the size and weight of the hunter. In fact, fatalities have occurred to hunters who, after a successful hunt, have overexerted themselves in handling the killed game and in combination with the excitement of a successful hunt, have suffered heart failure in a remote location where help was unavailable.

Accordingly, a need will be seen for a game tote or carrier which enables hunters to easily load the device and to tow the game from the field with minimal effort and exertion. The present game tote is collapsible, with a rigid frame which may be disassembled and a pliable sheet which is removable from the frame for compact storage of the assembly. The frame may be rolled in or otherwise stored with the sheet, and carried on the ATV to the hunting site. A relatively large game animal is easily rolled onto the present game tote, whereupon the device and game are towed from the site.

A discussion of the related art of which the present inventor is aware, and its differences and distinctions from the present invention, is provided below.

U.S. Pat. No. 3,912,290 issued on Oct. 14, 1975 to Robert S. Rich, titled "Collapsible Sled," describes a sled having a folding rigid structure with a series of rigid crossmembers. Two axle bearings are provided for each of four wheels, with one set positioning the wheels above the sled runners, and another positioning the wheels below the runners for operation on the wheels. No vehicle tow hitch means is disclosed by Rich. Rather, he provides a pair of pulling lines with loops at their distal ends, for manually pulling the sled. The disadvantages of such strenuous manual effort over a relatively long distance have been noted further above. The present game tote, with its vehicle tow hitch means, greatly reduces the manual labor required for removing killed game from the site.

U.S. Pat. No. 4,283,068 issued on Aug. 11, 1981 to Shirley A. Keyser, titled "Sled Structure," describes what is essentially a flexible tarp adapted for dragging on the ground by hand. No rigid structure nor runners or skids for such structure are disclosed, as provided by the present invention. Moreover, the Keyser tarp is adapted for pulling by hand, as in the case of the Rich sled discussed immediately above. Keyser does not provide any form of vehicle tow hitch means for the tarp, as provided by the present collapsible game tote invention.

U.S. Pat. No. 4,335,891 issued on Jun. 22, 1982 to Francis P. Alley et al., titled "Game Transportation Device," describes a sled essentially comprising a pliable plastic sheet. The sheet has no rigid structure except across the front end, where rope attaches for pulling the device by hand. Alley et al. do not provide a continuous peripheral rigid framework nor means for hitching the device to a motorized vehicle for towing, as provided by the present collapsible game tote.

U.S. Pat. No. 4,405,673 issued on Sep. 20, 1983 to Kenneth P. Fridley et al., titled "Skid Pad For Moving Heavy Items," describes a flexible tarp-like sheet having no rigid structure whatsoever. The Fridley et al. device includes padding, and is adapted for moving furniture, rather than for transporting game from a hunting site. No rigid skids or means for attaching the device to a conventional ball type trailer hitch is provided by Fridley et al., as provided by the present collapsible game tote. The Fridley et al. device more closely resembles the Keyser tarp than the present invention.

U.S. Pat. No. 4,887,823 issued on Dec. 19, 1989 to Thomas D. Hallett et al., titled "Drag Reducing Apparatus," describes a flexible tarp including peripheral ties for securing a deer or the like therein. No rigid frame nor towing means is provided with the Hallett et al. tarp, as provided in the present collapsible game tote invention. In order to drag the killed animal, a rope must be tied to some part of the animal (e. g., antlers) and used to pull the animal over the surface.

U.S. Pat. No. 5,529,321 issued on Jun. 25, 1996 to George R. Thompson, titled "Tarp Harness Draft And Equalizer Assembly," describes a lateral draw bar for attaching a flexible tarp thereto. While the draw bar is rigid, the tarp is not, with no continuous rigid peripheral frame, as provided in the present game tote. Moreover, the Thompson assembly cannot be secured to a conventional ball type hitch, as provided by the hitch means of the present invention. Rather, the Thompson hitch means comprises a hook for attaching to a draw bar type hitch assembly or through a simple hole in the rear structure of the towing vehicle, unlike the present invention.

U.S. Pat. No. 5,645,292 issued on Jul. 8, 1997 to James S. McWilliams et al., titled "ATV Trailer," describes a trailer having a rigid frame with a triangular cross section. A series of rigid cross braces extend between the two upper longitudinal members to a lower apex member, which also supports a lateral axle. No flexible tarp or other covering is disclosed by McWilliams et al. for their trailer. The McWilliams et al. device is tilted onto one side for loading a killed game animal thereon, then tipped back to support the device on its wheels. The hitch assembly allows the trailer to rotate about the longitudinal axis of the hitch to accomplish the above described operation. The hitch is a double tongue which secures to a draw bar hole type hitch of the towing vehicle; the device cannot be secured to a conventional ball type hitch, as can the hitch means of the present collapsible game tote.

U.S. Pat. No. 5,911,556 issued on Jun. 15, 1999 to Thomas M. Caldwell, titled "All-Terrain Vehicle Deer Caddy," describes a rigid rack which is hinged to the rear portion of an ATV. A retractable lifting leg may be extended beneath the rack to catch in the ground and lift the rack upwardly over the rear of the ATV as the vehicle is driven forward. No flexible tarp or sheet is provided over the framework, nor is any means provided for towing the assembly behind the ATV, as provided by the present game tote.

U.S. Pat. No. D-417,172 issued on Nov. 30, 1999 to Larry S. Smith et al. titled "ATV Utility Hauling Accessory," illustrates a design for a frame which is secured to both sides of the rear of an ATV. The Smith et al. device thus does not connect to the ATV by means of a conventional hitch ball, as in the present invention. A single castering wheel is provided at the rear of the frame to allow the necessary lateral motion due to the laterally rigid attachment to the ATV. No flexible tarp or sheet is provided to cover the frame; rather, a series of rigid lateral crossmembers extend between the frame sides, unlike the present game tote.

Finally, German Patent Publication No. 807,497 published on Jun. 28, 1951 to Wilhelm Pistor GmbH illustrates a rigid skid or sled for hauling cut trees or logs from a logging site. A flexible sheet cannot be used with such a device, as it would not be sufficiently durable. Also, the device cannot be disassembled for storage, as can the present collapsible game tote.

None of the above inventions and patents, either singly or in combination, is seen to describe the instant invention as claimed.

SUMMARY OF THE INVENTION

The present invention comprises a collapsible game tote for hauling killed large game out from the site of the kill, using an small, nimble all terrain vehicle (ATV) to tow the game tote and its game to a road, campsite, or other area as desired. The present game tote comprises a rigid peripheral frame which may be disassembled for compact storage when not in use. The elongate side structural members may be formed of pipe or tubing as desired, or may alternatively be fabricated in the field from poles or the like, thus further reducing the volume and mass of the present game tote. The frame is covered by a flexible tarp or sheet which extends continually across all of the frame members and supports a load placed thereon.

A hitch is provided extending from the front crossmember, for securing the game tote to a conventional ball-type trailer hitch provided on the back of the ATV. The hitch comprises a generally circular loop with a narrower elongate forward extension. The loop portion fits over the diameter of the ATV hitch ball, with the forward extension being drawn about the narrower neck of the hitch ball to prevent direct removal of the game tote hitch from the ball by lifting directly upwardly. Skids are provided at the trailing ends of the two longitudinal frame members, in order to hold the trailing edge of the tarp clear of the underlying terrain and to reduce friction. The skids may comprise various types or configurations, but all accomplish the function of precluding or reducing wear on the remainder of the structure.

Accordingly, it is a principal object of the invention to provide an improved collapsible game tote for removably securing to the conventional ball type trailer hitch of an all terrain vehicle, for removing killed game from the field.

It is another object of the invention to provide an improved game tote comprising a disassembleable peripheral frame having a removable flexible sheet covering for the carriage of articles thereon.

Still another object of the invention is to provide an improved game tote which peripheral frame and other rigid components may be rolled or otherwise stored within the flexible sheet covering for compact storage of the device.

It is a further object of the invention to provide an improved game tote including skid means disposed at the trailing ends of each of the longitudinal members of the frame, for providing ground clearance for the rearward portion of the device.

An additional object of the invention is to provide an improved game tote which longitudinal members may be formed of poles cut in the field, if so desired.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
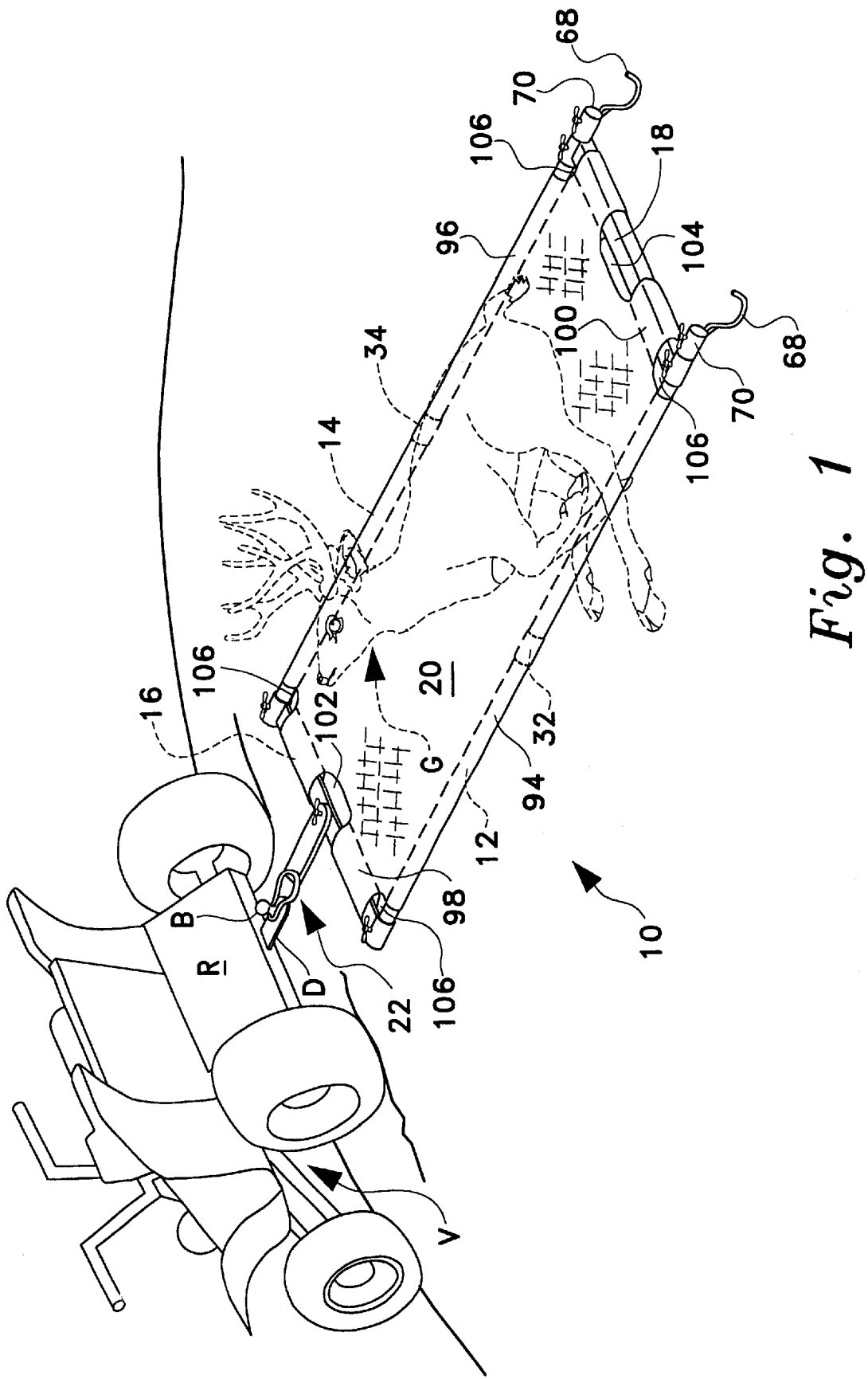
FIG. 1 is an environmental perspective view of the present collapsible game tote, showing its operation as towed behind an all terrain vehicle.

The present invention comprises a collapsible or disassembleable game tote, for storage upon and towing behind a conventional small off road, all terrain vehicle (the term "ATV" is used hereafter for such a vehicle) having a conventional ball-type trailer hitch. FIG. 1 provides an environmental perspective view of such an assembly, as might be used for retrieving a killed large game animal (deer, elk, etc.) from a remote, roadless site to a campsite or road for further transport.

Figure 3:
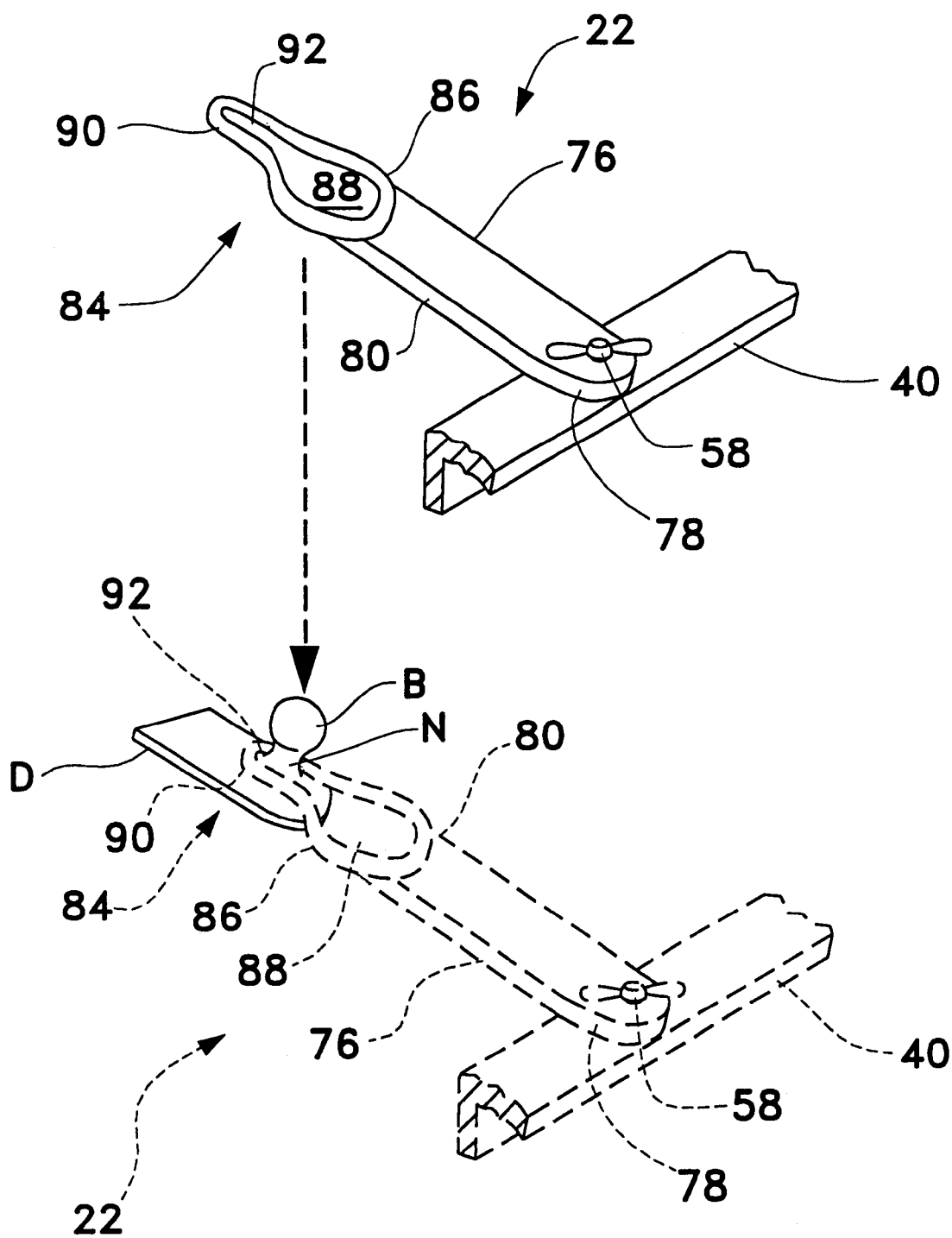
FIG. 3 is a broken away perspective view of the hitch assembly of the present game tote, showing its positive connection to a conventional ball type trailer hitch.

The assembled game tote 10 generally comprises opposite left and right longitudinal frame members, respectively 12 and 14, and opposite front and rear frame crossmembers, respectively 16 and 18, defining a generally rectangular frame. A sheet 20 of a flexible, pliable material (e. g., canvas or other fabric, etc.) is removably secured generally completely and continuously across the assembled frame, to form a surface for the carriage and transport of a killed large game animal G or other article, as illustrated in FIG. 1 of the drawings. A hitch assembly 22 extends forwardly from the front crossmember 16, for removably securing the game tote 10 to the conventional hitch ball B extending from the rearward portion R of the all terrain vehicle V, generally as shown in FIG. 1; a more detailed illustration of the hitch assembly 22 and its connection to the hitch ball B is shown in FIG. 3 of the drawings.

Figure 2:
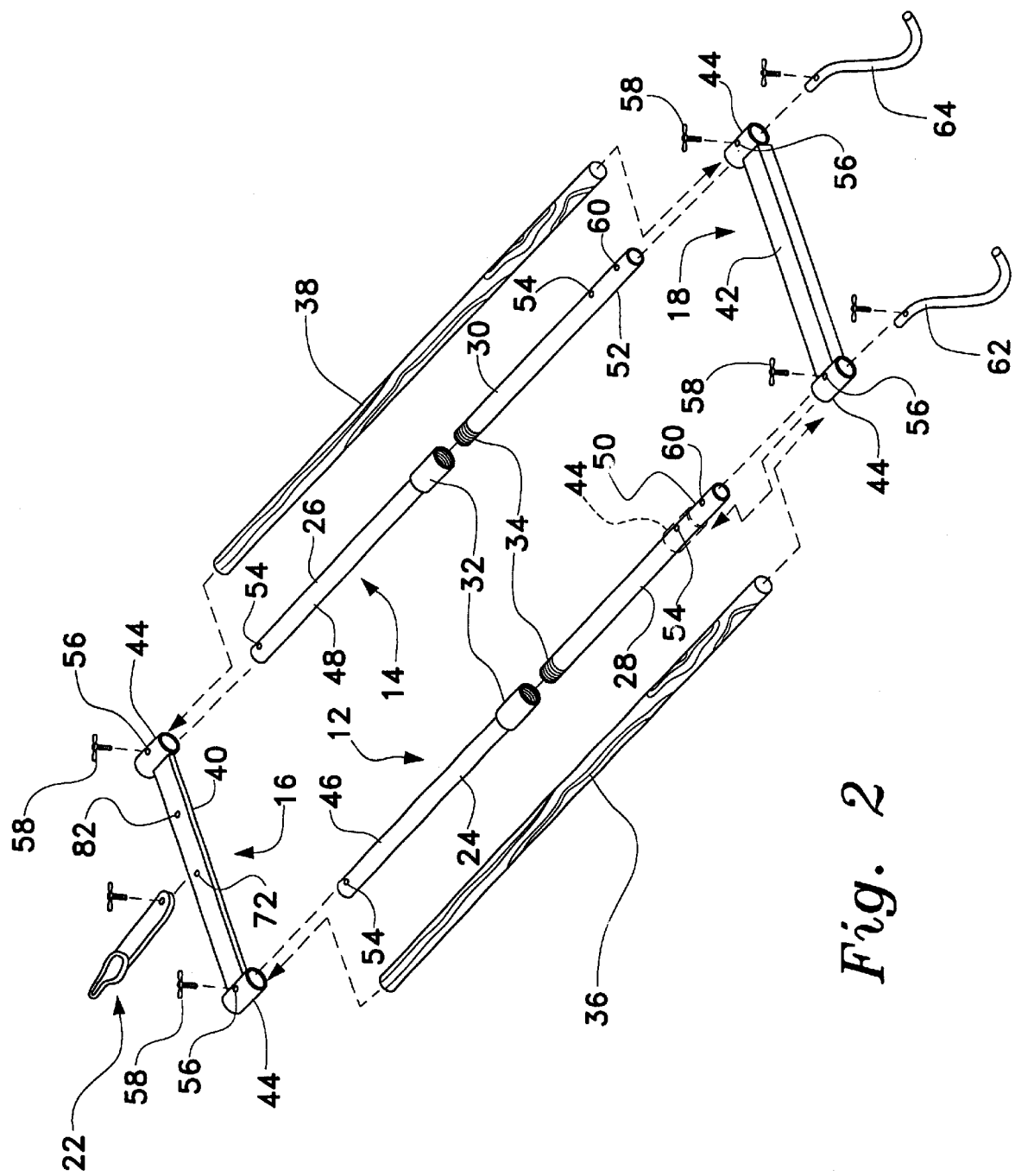
FIG. 2 is an exploded perspective view of the rigid structural components of the present game tote, including alternative pole members for the longitudinal members.

FIG. 2 provides an exploded perspective view illustrating the various frame components and alternatives for the game tote 10. The two longitudinal members 12 and 14 are each formed of sections of hollow cylindrical metal pipe or tube, such as EMT (electrical metal tubing) or other reasonably light weight and suitable material of sufficient strength for the purpose. Each member 12 and 14 comprises a front portion, respectively 24 and 26, and a rear portion, respectively 28 and 30. One pair of these sections (e. g., front portions 24 and 26) has a coupling 32, with the remaining portions (e. g., rear portions 28 and 30) having cooperating ends 34 for removably engaging the fittings 32 for linearly assembling each forward and rearward portion 24, 28 and 26, 30 to form the longitudinal frame members 12 and 14. The couplings 32 and cooperating ends 34 may be internally threaded fittings with the ends 34 having cooperating external threads, quick release, "bayonet" type fittings, a simple plug and socket configuration with a diametric pin therethrough, or other connecting means as desired. The specific means is not critical, so long as it provides a secure assembly which holds the forward and rearward sections concentrically together and does not permit any significant joint flexure when the assembled game tote 10 is loaded. Alternatively, the longitudinal members may each be formed of a single length of pole 36, 38, which may be cut in the field as desired. If a person knows that they will be able to find and cut such poles 36 and 38 where the game tote 10 is to be assembled, they may wish to leave behind the various components 24 through 30 comprising the disassembleable longitudinal members 12 and 14, to save weight and volume during carriage of the folded game tote 10.

Each front and rear crossmember 16 and 18 comprises a rigid, elongate component, respectively 40 and 42, having left and right connector tubes 44 permanently secured (welded, etc.) to respective ends of the crossmember lengths 40 and 42. These tubes 44 each have an inner diameter closely fitting about the outer diameters of the longitudinal members 12 and 14, as indicated by the broken line showing of one of the rear tubes 44 installed over the rear portion 28 of the left longitudinal member 12 in FIG. 2. The crossmember lengths 40 and 42 may be formed of metal angle stock for sufficient rigidity and durability, or other suitable material as desired.

The forward ends, respectively 46 and 48, and the rearward ends, respectively 50 and 52, of the left and right longitudinal frame members 12 and 14, each have a crossmember attachment passage 54 formed diametrically therethrough. Each of the connector tubes 44 has a cooperating longitudinal member passage 56 formed diametrically therethrough, with corresponding passages 54 and 56 being in concentric alignment with one another when the frame components 12 through 18 are assembled. A series of hand assembly fasteners 58 is provided for inserting through each cooperating passage pair 54 and 56 to secure the frame members 12 through 18 securely together. These fasteners 58 may comprise wing headed screws which thread into cooperating nuts or threaded passages provided in the opposite sides of the connector tubes 44, or other suitable fastener means as desired.

It will be noted in FIG. 2, that the crossmember attachment passages 54 of the rearward portions 28 and 30 of the longitudinal members 12 and 14, pass through the rearward ends 50, 52 somewhat forwardly of their absolute ends. Additional skid attachment passages 60 are formed rearwardly of the rearward crossmember attachment passages in each rearward end 50, 52 of the two rearward longitudinal member portions 28 and 30. Left and right skids, respectively 62 and 64, each have an outer diameter closely fitting within the inner diameter of the hollow tubular members 28 and 30. Each skid 62 and 64 comprises a downwardly curved, solid rod formed of a durable and wear resistant material (e. g., metal, ultra high molecular weight plastic, etc.). A fastener attachment passage 66 is provided through the attachment end of each of the skids 62 and 64, with hand assembly fasteners 58 being used to secure the skids in place. These two skids 62 and 64 serve to elevate the rearward end of the game tote 10 slightly above the underlying surface, thereby greatly reducing or precluding wear and tear upon at least the rearward end of the tote.

An alternative skid configuration is illustrated in FIG. 1 of the drawings. In FIG. 1, each skid comprises a steel rod 68 which is welded or otherwise rigidly and permanently secured to a coupling tube 70, similar to the connector tubes 44 described further above. The two skid coupling tubes 70 pass over the rearward ends of the longitudinal members 12 and 14, with appropriate fastener passages and fasteners being provided similar to those described further above for securing other components together.

Another alternative which is particularly suitable when the alternative poles 36 and 38 are used as the longitudinal members, is to provide longer connector tubes for the rearward crossmember 18, with the forward portion of such a longer connector tube securing about the extreme end of the pole or longitudinal member, and the rearward portion providing for the removable insertion or permanent attachment of one of the skid member embodiments described further above. (It will be seen that in any event, appropriate passages must be provided through the two poles 36 and 38 when they are used as the two longitudinal members of the present game tote 10.)

Figure 4:
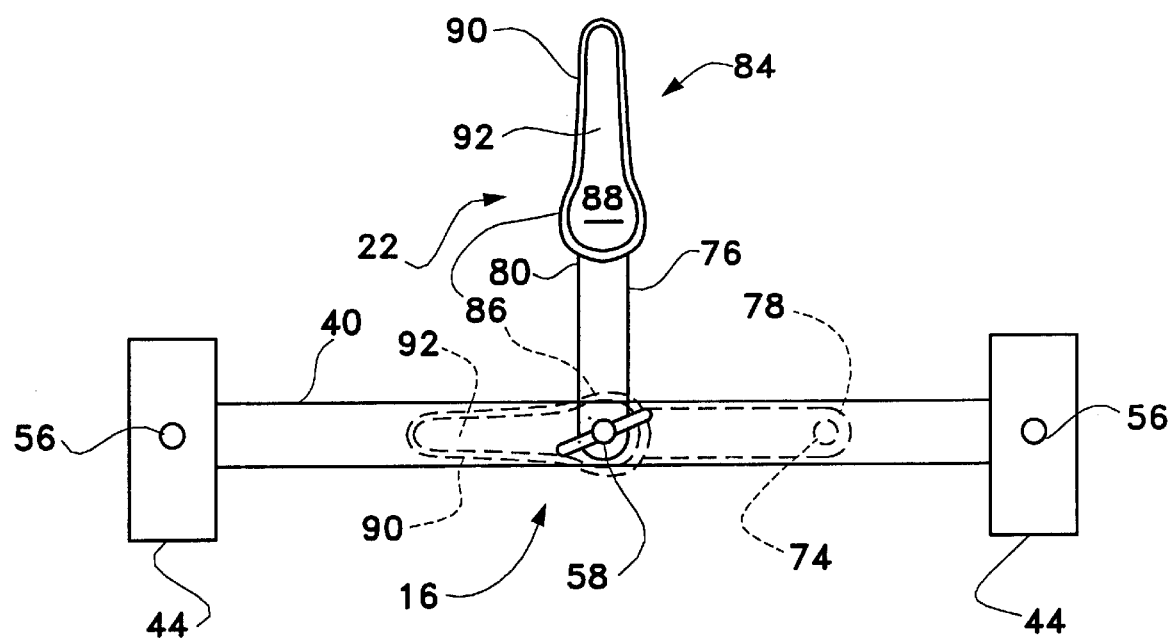
FIG. 4 is a top plan view of the front crossmember of the present game tote, showing the folding means for the hitch and tongue.

The forward crossmember 16 includes means to removably attach the hitch assembly 22 thereto, shown in greater detail in FIG. 4. The elongate front crossmember arm or component 40 has a central hitch tongue attachment passage 72 therethrough (shown in FIG. 2), through which a hand assembly fastener 58 is secured to attach the hitch assembly 22 for towing the present game tote 10. The hitch assembly 22 may be rotated about this attachment point to a certain degree, but is sc long that it interferes with the distal tubular connector 44 of either end of the front crossmember assembly 16. Accordingly, an offset secondary hitch storage passage 74 is provided through the front crossmember arm 40, for the hitch assembly to be secured thereto. This secondary passage is sufficiently far from the left hand connector 44, that it may be folded to lie along and parallel to the crossmember arm 40, without interfering with either connector 44 at either end thereof.

FIGS. 3 and 4 illustrate the present hitch assembly 22 in detail, with FIG. 4 showing its removable attachment to a tow hitch assembly. The tow hitch assembly comprises a draw bar D extending rearwardly from the towing vehicle V (shown in FIG. 1), with a hitch ball B extending upwardly from the rear portion of the draw bar D and separated therefrom by a narrower neck N. The hitch assembly 22 comprises an elongate hitch tongue 76 having opposite frame attachment and hitch ball attachment ends, respectively 78 and 80. The frame attachment end 78 has a crossmember attachment passage 82 therethrough (shown in FIG. 2), while the hitch ball end 80 has a hitch ball fitting 84 extending forwardly therefrom.

The hitch ball fitting 84 comprises a continuous length of rigid material (e. g., bent up from a metal rod, etc.) which defines a generally circular portion 86 defining a hitch ball passage 88 therethrough, and a contiguous hitch ball neck attachment link 90 extending forwardly from the circular portion 86 and defining a slot 92. As shown in FIG. 3, the hitch ball passage 88 has a diameter slightly larger than the hitch ball B, and passes over the hitch ball B with the fitting 84 then resting atop the draw bar D of the vehicle V to connect the hitch assembly 22 and game tote 10 to the vehicle V.

When the vehicle V is drawn slightly forward (or the game tote 10 is moved slightly rearwardly), the hitch ball B is drawn forwardly of the hitch ball passage, with the narrower neck N of the hitch ball B then passing into the narrower slot 92 of the neck attachment link 90. The link 90 is narrower than the diameter of the hitch ball B, and thus the link 90 cannot raise upwardly to separate from the hitch ball B and its attachment to the vehicle V. Thus, so long as tension is applied to the hitch assembly 22 by the hitch ball B and draw bar D, the hitch assembly 22 cannot come loose from its attachment to the hitch ball B and draw bar D of the towing vehicle V. Yet, the present hitch assembly 22 is easily removed from the hitch ball B by merely backing up the vehicle V a few inches (or pulling the game tote 10 forward a like amount) to position the hitch ball B within the circular hitch ball passage 88. The hitch assembly 22 may then be lifted clear of the ball B, to separate the game tote 10 from the towing vehicle V.

The components shown in FIG. 2 of the present game tote 10 are quickly and easily assembled in the field, generally as described above. First, the hitch assembly 22 is removed from its storage position shown in broken lines in FIG. 4, for later installation to the center passage 72 of the forward crossmember 16. Before assembly of the frame components 12 through 18, the two elongate longitudinal members 12 and 14 (or poles 36 and 38 of FIG. 2) and crossmembers 16 and 18 are inserted into their respective sleeves formed in the left, right, forward, and rearward edges of the rectangular cover sheet 20, respectively left and right longitudinal frame member sleeves 94 and 96, and forward and rearward frame crossmember sleeves 98 and 100, shown in FIG. 1 of the drawings.

The forward and rearward sleeves 98 and 100 include respective cutouts 102 and 104 therein, for clearance of the attachment of the hitch assembly 22 to the forward crossmember 16. Each end of the sheet 20 includes such cutouts, in order that the sheet may be made symmetrical without concern as to which end must be assembled with which crossmember. Also, corner cutouts 106 are provided for access to the ends of each of the frame members 12 through 18, to allow for installation of the fasteners 58 therein and skids 62, 64, or 68.

When the various longitudinal and crossmembers 12 through 18 have been loosely inserted into their respective peripheral sleeves 94 through 100, they may be assembled together to form a rigid rectangular structure by means of the various connector tubes 44 and fasteners 58, with the hitch assembly 22 being secured to the central passage 72 of the front crossmember 16. The skids 62, 64 or 68 are secured to the rearward ends 50, 52 of the two longitudinal members 12 and 14, and the present game tote 10 is then ready for use in the field. Disassembly is quickly and easily accomplished by reversing the above procedure, with the disassembled frame components being compactly stored within the rolled sheet 20, and/or a conventional storage bag or the like as desired.

In summary, the present portable game tote provides much needed convenience in the field for the hunter or other person who needs to carry a relatively large and/or heavy load from an unimproved area. The game tote may be laid out on the surface, with its height essentially the same as that of the underlying surface when it is not connected to a towing vehicle. The game or other bulky article(s) may then be rolled easily onto the cover sheet and tied down to the peripheral frame members by conventional means (e. g., ropes, bungee cords, etc.). The forward end of the device is then lifted to place the hitch assembly on the hitch of the towing vehicle. This is easily accomplished, as the weight which must be lifted is only about half the total, or perhaps less, if the load is positioned rearwardly on the game tote.

The game tote and its load are then easily removed from the site to another area as desired, using the towing vehicle. The positive attachment of the hitch assembly of the game tote assures that it will remain in tow on the towing vehicle at all times, so long as tension is applied between the vehicle and game tote. The rearward skids of the tote not only serve to support the rear of the tote to preclude wear and tear on the rearward structure thereof, but also provide drag to assure constant tensile force on the hitch assembly even during braking and/or downhill travel. Even if the game tote moves forwardly relative to the towing vehicle hitch, the game tote hitch assembly cannot release, as constant down force is applied thereto due to the only other support for the game tote being positioned at the extreme rearward end thereof.

Once the load has been delivered to the desired site and removed from the game tote, the device is quickly and easily disassembled for compact storage, by reversing the above described assembly procedure. The device may then be stored as desired with the ATV or other vehicle until further use is needed.

While the present invention is described as a "game tote," it should be noted that many other uses may be applied to the present device. The present tote may be used for hauling yard waste and the like behind a lawn tractor or similar vehicle, and/or for any of a number of other uses limited only by the imagination.

It is to be understood that the present invention is not limited to the embodiments described above, but encompasses any and all embodiments within the scope of the following claims.

I claim:

1. A collapsible game tote, comprising:

a left and a right longitudinal frame member;

each said longitudinal frame member having a forward end, a rearward end opposite said forward end, and an outer diameter;

a front frame crossmember;

a rear frame crossmember;

each said frame member and crossmember including means for removably assembling to one another to form a rigid rectangular frame when assembled together;

a flexible, pliable sheet removably secured over said frame and extending essentially completely thereacross;

said front frame crossmember including hitch means removably secured thereto;

each said longitudinal frame member having a rearward end with skid means removably extending therefrom;

said hitch means comprising an elongate tongue having a frame attachment end and a hitch ball attachment end opposite said frame attachment end;

a hitch ball fitting extending from said hitch ball attachment said hitch ball fitting comprising a continuous length of material having a generally circular portion defining a passage, said passage adapted to pass over a trailer hitch ball;

a continuous neck attachment link, said neck attachment link defining a slot smaller than said passage, said slot communicating with and extending forwardly from said passage and adapted to removably capture a neck of a trailer hitch ball.

2. The collapsible game tote according to claim 1, wherein:

each said longitudinal frame member comprises a front portion and a rear portion; and each said front portion is removably assembled to a corresponding said rear portion for forming a linear assembly.

3. The collapsible game tote according to claim 2, wherein:

each said longitudinal frame member is formed of hollow metal tubing; and each said front portion and each said rear portion includes mating coupling means for removably and linearly securing each said front portion to the corresponding said rear portion.

4. The collapsible game tote according to claim 1, wherein:

each said longitudinal frame member comprises a single wood pole.

5. The collapsible game tote according to claim 1, wherein said means for removably assembling each said frame member and crossmember to one another comprises:

each said frame crossmember comprising a length of metal angle stock having a left end and a right end;

each said end having a connector tube permanently affixed thereto; and each said connector tube having an inner diameter for fitting closely about said outer diameter of a corresponding said longitudinal frame member at one said end thereof.

6. The collapsible game tote according to claim 5, including:

a crossmember attachment passage formed through each said end of each said longitudinal, frame member;

a longitudinal member attachment passage formed through each said connector tube of each said frame crossmember; and a plurality of hand assembly fasteners for passing through a corresponding said crossmember attachment passage and said longitudinal member attachment passage, for securing each said longitudinal frame member and each said frame crossmember together.

7. The collapsible game tote according to claim 1, wherein:

said sheet comprises a durable fabric material having a rectangular periphery with a left edge, a right edge, a front edge, and a rear edge;

said left edge and said right edge each having a longitudinal frame member sleeve formed therealong, for removably installing one said longitudinal frame member therein; and said front edge and said rear edge each having a frame crossmember sleeve formed therealong, for removably installing one said frame crossmember therein.

8. The collapsible game tote according to claim 1, wherein said front frame crossmember includes:

a hitch tongue attachment passage formed generally centrally therethrough, and;

a hitch storage passage formed therethrough to one side of said hitch tongue attachment passage, for removably securing said hitch to said front frame crossmember and generally parallel thereto for compact storage.

9. The collapsible game tote according to claim 1, wherein said skid means comprises:

a left and a right skid member removably secured to said rearward end of a corresponding said longitudinal frame member; and each said skid member comprising a downwardly curved, solid rod for supporting at least said rear frame crossmember above an underlying surface.

\* \* \* \* \*